US009461886B2

(12) United States Patent
Rácz et al.

(10) Patent No.: US 9,461,886 B2
(45) Date of Patent: Oct. 4, 2016

(54) SELF-ORGANIZING NETWORK FUNCTION INTERACTION

(71) Applicant: Telefonaktiebolaget L M Ericsson (publ), Stockholm (SE)

(72) Inventors: András Rácz, Budapest (HU); Mehdi Amirijoo, Linköping (SE); Fredrik Gunnarsson, Linköping (SE); Harald Kallin, Sollentuna (SE); Johan Moe, Mantorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/380,248

(22) PCT Filed: Feb. 22, 2013

(86) PCT No.: PCT/EP2013/053595
§ 371 (c)(1),
(2) Date: Aug. 21, 2014

(87) PCT Pub. No.: WO2013/124435
PCT Pub. Date: Aug. 29, 2013

(65) Prior Publication Data
US 2015/0043386 A1    Feb. 12, 2015

Related U.S. Application Data

(60) Provisional application No. 61/601,861, filed on Feb. 22, 2012.

(51) Int. Cl.
*H04L 12/24* (2006.01)
*H04W 24/02* (2009.01)
*H04W 88/18* (2009.01)

(52) U.S. Cl.
CPC ......... *H04L 41/0886* (2013.01); *H04L 41/044* (2013.01); *H04L 41/0813* (2013.01); *H04L 41/0823* (2013.01); *H04W 24/02* (2013.01); *H04W 88/18* (2013.01)

(58) Field of Classification Search
CPC .......... H04L 41/0873; H04L 41/0886; H04L 41/0816; H04L 2012/5623; H04L 41/0823; H04W 84/12; H04W 24/08; H04W 24/02; H04W 84/18
See application file for complete search history.

(56) References Cited

U.S. PATENT DOCUMENTS

| | | | |
|---|---|---|---|
| 2010/0232318 A1* | 9/2010 | Sarkar | H04W 28/18 370/254 |
| 2011/0171952 A1* | 7/2011 | Niu | H04L 43/0882 455/422.1 |

(Continued)

OTHER PUBLICATIONS

Schmelz, L et al., "A Coordination Framework for Self-Organisation in LTE Networks", 2011 IFIP/IEEE International Symposium on Integrated Network Management, Dublin, Ireland, May 23-27, 2011, pp. 193-200.

(Continued)

*Primary Examiner* — Jung-Jen Liu
(74) *Attorney, Agent, or Firm* — Murphy, Bilak & Homiller, PLLC (57) ABSTRACT

A set of reporting features are specified for implementation by lower-level Self-Optimizing Network (SON) functions to support the observation of network SON algorithms by high-level SON functions (e.g., OAM functions). The lower-level SON functions may be operative to adjust local parameters related to the network element serving area and/or capacity. The reported SON algorithm events and measurements can be defined such that they can be used by the higher-level SON function to resolve conflicts and control the lower-level SON functions. Some embodiments specify SON function reporting features and their configuration in the framework of the 3GPP defined Itf-N interface specification.

25 Claims, 5 Drawing Sheets

(56) References Cited

U.S. PATENT DOCUMENTS

| | | | | |
|---|---|---|---|---|
| 2011/0280157 A1* | 11/2011 | Suerbaum | ........... | H04L 41/0663 370/255 |
| 2012/0066377 A1* | 3/2012 | Li | ........................ | H04L 12/24 709/224 |
| 2012/0213057 A1* | 8/2012 | Zhang | .................. | H04W 24/02 370/216 |
| 2012/0282968 A1* | 11/2012 | Toskala | ................ | H04W 24/10 455/517 |
| 2013/0229914 A1* | 9/2013 | Suerbaum | ............ | H04W 24/02 370/229 |
| 2015/0071118 A1* | 3/2015 | Sanneck | ............ | H04L 41/0816 370/255 |

OTHER PUBLICATIONS

Unknown, Author, "3GPP TS 32.522, V11.1.0 (Dec. 2011)", 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11), Dec. 2011, pp. 1-32.

Unknown, Author, "3GPP TS 32.662, V10.0.0 (Mar. 2011)", 3rd Generation Partnership Project; Technical Specification Group Services and System Aspects; Telecommunication management; Configuration Management (CM); Kernel CM Information Service (IS) (Release 10), Mar. 2011, pp. 1-22.

Unknown, Author, "Generic Solution for SON Coordination", 3GPP TSG SA WG5 (Telecom Management) Meeting #81, S5-110112, Dresden, Germany, Jan. 6-10, 2012, pp. 1-2.

Unknown, Author, "Handling of Attribute Ranges at Domain Borders for SON Coordination", 3GPP TSG-SA5 (Telecom Management), S5-113020, Nanjing, China, Oct. 10-14, 2011, pp. 1-6.

* cited by examiner

SELF-ORGANIZING NETWORK FUNCTION INTERACTION

TECHNICAL FIELD

The present disclosure relates generally to Self-Organizing Network (SON) functions, and in particular to methods of interaction between hierarchical SON functions and to network nodes configured to carry out such methods.

BACKGROUND

Wireless communication networks are ubiquitous, and are becoming increasingly complex as new standards and protocols are established to increase the number of subscribers, data rates, efficiency, and the number and variety of services delivered to subscribers.

Figure 1:
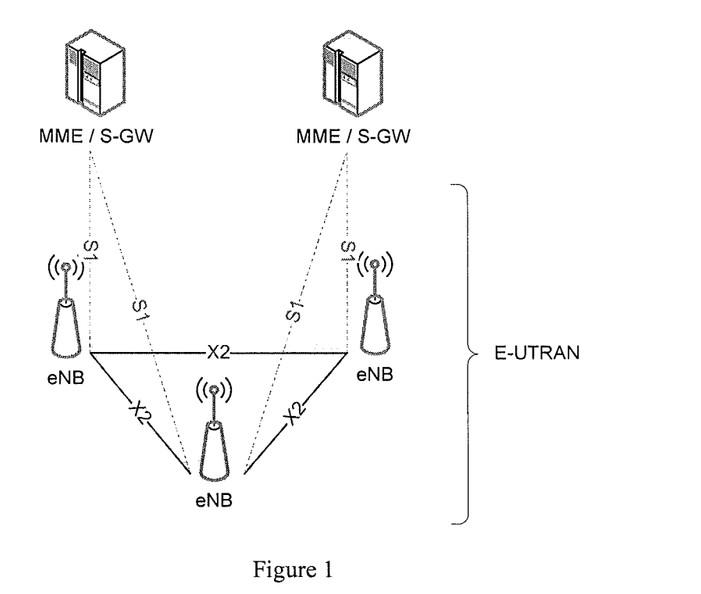
FIG. 1 is a functional block diagram of a LTE network.

One representative example of a modern wireless communication network standard is the Long Term Evolution (LTE), defined by the Third Generation Partnership Project (3GPP). FIG. 1 depicts a functional block diagram of a LTE network, including a core network (i.e., the evolved packet core) and a Radio Access network (i.e., the Evolved Universal Terrestrial Radio Access Network, or E-UTRAN). The evolved packet core network nodes include those having the functionality of a Mobile Management Entity (MME) and a Signalling Gateway (S-GW). The E-UTRAN nodes include evolved Node B's (eNB). The eNBs connect to each other over the logical X2 interface, and to the MME/SGWs over the logical S1 interface.

Figure 2:
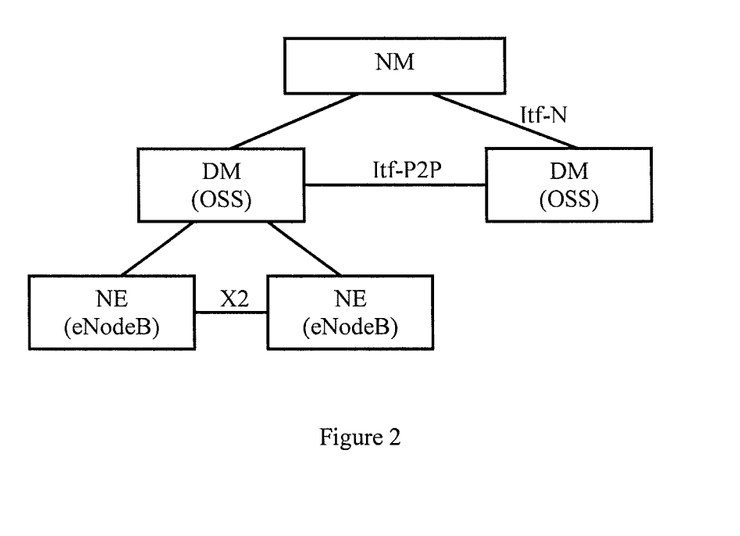
FIG. 2 is a functional block diagram of hierarchical network management.

A representative management system is shown in FIG. 2. The node elements (NE), also known as an eNodeB or eNB, are managed by a domain manager (DM), also referred to as the operation and support system (OSS). A DM may further be managed by a network manager (NM). Two NEs are interfaced by X2, whereas the interface between two DMs is referred to as Itf-P2P. Note that, although embodiments of the present invention are described herein with respect to 3GPP LTE, the invention is applicable to any wireless communication network protocol (e.g., WCDMA, GSM, WiMAX, etc.).

The management system may configure the network elements, as well as receive observations associated to features in the network elements. For example, DM observes and configures NEs, while NM observes and configures DM, as well as NE via DM. Thus, the management system is hierarchical, with a high-level NM receiving information from, and controlling, lower-level DM functions and NEs. Any function that automatically optimizes NE parameters can in principle execute in the NE, DM, or the NM.

Functions that automatically monitor network operations and parameters, and user actions, and automatically take actions to optimize network operations are referred to as Self-Organizing Network (SON) functions. SON functions are also structured hierarchically—with a high-level SON function (for example, a NM) operating to optimize the overall network, and a plurality of lower-level SON functions (for example, at each NE) locally optimizing the NE, under the control and direction of the high-level SON function. The terms "high-level SON function," "network manager (NM)" or "network management system (NMS)," and "centralized SON function" are used synonymously herein. Similarly, "lower-level SON functions" are sometimes referred to as "network element (NE)" SON functions or "distributed" SON functions.

The SON functions may vary depending on the time scale on which they operate (e.g., ranging from seconds/minutes level to hours/days level), the target parameter set, and the type of optimization that they execute. For example, SON functions that require fast operation and/or dealing with individual per user actions are typically deployed in the network, close to the radio interface. Other functions that operate on a longer time scale and dealing with cell level optimizations can be deployed higher up in the management system.

To support interaction between SON functions in the network and the OAM system (or between lower-level SON functions and a high-level SON function) there exists a minimal set of control functions defined and standardized by 3GPP. This includes, for example, the setting of target parameters for network SON functions or specifying the importance of one target as compared to others via assigning priorities (see, for example, Section 4.7 of TS 32.522, V11.1.0, 2011-12, for more details).

The 3GPP standard also defines notification procedures on the Itf-N interface, which can be used by the DM to notify the NM when some configuration parameters have been changed in the network. This can help the NM to get an up-to-date view of the network configuration, covering, for instance, cases when the NE SON function has changed certain cell parameters. However, the indication does not reveal which function has changed this parameter (e.g., which SON function) or the specific reason of the change.

Although, the different SON functions deployed in different parts of the system (i.e., in the NE, in DM or NM) typically have different scope and targeting different sets of parameter tuning, it is not possible and not even desirable to avoid overlaps completely. Partly, this is due to the fact that the same problem, showing the same or similar symptoms could be solved in different ways by different SON algorithms. For example, load balancing may be executed by forced handover of users between neighboring cells, which can be executed by a SON function in the RAN or it could be executed by changing the cell sizes via antenna tilting from the OAM system.

Currently there is no solution specified for information exchange between SON functions at different hierarchical levels, i.e., lower-level SON functions in the network and high-level SON function in the OAM, that would be sufficient to resolve conflicts and avoid interference between the different SON functions. The currently defined Performance Measurements (PM) (i.e., counters, Key Performance Indicators (KPI), events) are not sufficient for the observation of the actions and the operation of lower-level SON functions from the high-level SON function. The notification mechanisms defined in the standard for indication of network parameter changes are not sufficient for SON coordination purposes, as they do not cover notification of actual SON actions, and do not reveal which function has initiated the reconfiguration and for what reason.

This means that the SON functions at different hierarchical levels must act "blindly" in the sense that they do not have information regarding the actions of the other SON functions working on the same or similar objective. This could result in a situation wherein one SON function nullifies the effect of the other SON function, or the two SON functions get stuck in a suboptimal solution.

Accordingly, there is a need for a technique that improves the interaction among hierarchically arranged SON functions.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments described and claimed herein, a set of reporting features are specified that could be implemented by lower-level SON functions to support the observation of network SON algorithms by high-level SON functions (e.g., OAM functions). The lower-level SON functions may be operative to adjust local parameters (e.g., related to the network element serving area and/or capacity). The reported SON algorithm events and/or measurements may be defined such that they can be used by the higher-level SON function to resolve conflicts and control the lower-level SON functions. Some embodiments specify SON function reporting features and their configuration in the framework of the 3GPP defined Itf-N interface specification.

One embodiment relates to a method, by a high-level SON function in a hierarchical structure of SON functions in a network, of interaction with one or more lower-level SON functions. Information regarding network conditions or subscriber activity is received from one or more lower-level SON functions, the information including the identity of the one or more lower-level SON functions and any network optimization actions performed by the lower-level SON function. The information received from the one or more lower-level SON functions is analyzed. One or more actions to optimize the network are performed in response to the information analysis.

The information may include a network optimization action performed by the one or more lower-level SON functions.

Moreover, the information regarding network condition may pertain to conditions of the one or more lower-level SON functions. In one example, such conditions of the one or more lower-level SON functions may pertain to an internal status of the one or more lower-level SON functions (such as SON function states, SON targets, possible impacts of actions taken or to be taken by the lower-level SON functions, SON coordination policies, and so on).

The information may additionally or alternatively include one or more network optimization recommendations. The network optimization recommendation may be performed by the lower-level SON functions. In some embodiments, the network optimization recommendation is a suggested configuration parameter for the one or more lower-level SON functions.

The method step of performing one or more actions to optimize the network may include adjusting one or more operation parameters of the network. Adjusting the one or more operation parameters of the network may alter the geographic serving area of one or more network elements operative to provide wireless communication services to one or more subscribers or the capacity of one or more network elements operative to provide wireless communication services to one or more subscribers.

The one or more operation parameters may include a configuration parameter for the one or more lower-level SON functions.

In one implementation, the information includes a description of a problem detected by the one or more lower-level SON function and/or details of the problem. The description of the problem may further include an anticipated source of the problem and/or a suggested solution to the problem.

In one implementation, the one or more operation parameters includes whether the one or more lower-level SON functions are activated or deactivated.

In one implementation, the information is received over a 3GPP Itf-N interface, wherein the interface may include the Itf-N SON Policy Network Resource Model Integration Reference Point, the Itf-N Performance Management Integration Reference Point, and/or the Itf-N trace Integration Reference Point.

The information may include load balancing reporting, handover statistics, and/or individual User Equipment actions.

Another embodiment relates to a method, by a lower-level SON function in a hierarchical structure of SON functions in a network, of interaction with a high-level SON function. Information regarding network conditions or subscriber activity (e.g., related to a network element operative to provide wireless communication services to subscribers) is gathered. The information, including the identity of the lower-level SON function, is sent to a high-level SON function in the network. The method may further include performing one or more network optimization actions, and wherein the information includes the actions performed.

In one example, the method may further include maintaining information about at least one of the actions taken by and/or the status of the lower-level SON function. The information may be maintained locally in a database or any other data repository. Furthermore, the maintained information may be regularly updated as needed.

In one implementation, the information additionally includes one or more network optimization recommendations. The network optimization recommendation may be performed by the lower-level SON functions. In some implementations the network optimization recommendation is a suggested configuration parameter for the one or more lower-level SON functions.

The information regarding networks conditions may in one variant pertain to conditions of the one or more lower-level SON functions, such as an internal status of the one or more lower-level SON functions.

The method may further include receiving, from the high-level SON function, one or more target parameters, and performing local network optimization according to the target parameters. The method may also include receiving, from the high-level SON function, an indication to activate or deactivate a network optimization or not, in response to the indication.

In one implementation, the method may include detecting a problem associated with the network element, wherein the information includes a description and/or details of the problem. The description of the problem may further include an anticipated source of the problem and/or a suggested solution to the problem.

In some implementations, sending the information includes sending the information over a 3GPP Itf-N interface. wherein the interface may include the Itf-N SON Policy Network Resource Model Integration Reference Point, the Itf-N Performance Management Integration Reference Point, and/or the Itf-N trace Integration Reference Point.

The information may include load balancing reporting, handover statistics, and/or individual User Equipment actions.

A network node according to one aspect includes a network interface, a controller operatively connected to a memory and the network interface. The memory is operative to store computer program code containing instructions operative to cause the controller to implement the functionality of a high-level Self-Organizing Network "SON" function, the high-level SON function in a hierarchical structure of SON functions in a network, to interact with one or more lower-level SON functions.

The controller is operable to receive, from one or more lower-level SON functions, information regarding network conditions or subscriber activity, the information including the identity of the one or more lower-level SON functions, analyze the information received from the one or more lower-level SON functions, and perform one or more actions to optimize the network in response to the information analysis. The information may include a network optimization action performed by the one or more lower-level SON functions.

In one variant, the information regarding network conditions pertained to conditions of the one or more lower-level SON functions, such as an internal status of or any parameter pertaining to the one or more lower-level SON functions.

The information may additionally include one or more network optimization recommendations. The network optimization recommendation may be performed by the lower-level SON functions. In some embodiments, the network optimization recommendation is a suggested configuration parameter for the one or more lower-level SON functions.

In one implementation, the one or more actions to optimize the network may include adjusting one or more operation parameters of the network. Adjusting the one or more operation parameters of the network may alter the geographic serving area of one or more network elements operative to provide wireless communication services to one or more subscribers or the capacity of one or more network elements operative to provide wireless communication services to one or more subscribers. The one or more operation parameters may include a configuration parameter for the one or more lower-level SON functions.

In one implementation, the information includes a description of a problem detected by the one or more lower-level SON function and/or details of the problem. The description of the problem may further includes an anticipated source of the problem and/or a suggested solution to the problem.

In one implementation, the one or more operation parameters includes whether the one or more lower-level SON functions are activated or deactivated.

In one implementation, the information is received over a 3GPP Itf-N interface, wherein the interface may include the Itf-N SON Policy Network Resource Model Integration Reference Point, the Itf-N Performance Management Integration Reference Point, and/or the Itf-N trace Integration Reference Point.

The information may include load balancing reporting, handover statistics, and/or individual User Equipment actions.

An access network node according to one aspect includes a network interface, a transceiver operative to transmit and receive signals via one or more antennas, the one or more antennas, a controller operatively connected to a memory, the network interface, and the transceiver. The memory is operative to store computer program code containing instructions operative to cause the controller to implement the functionality of a lower-level Self-Organizing Network "SON" function, the lower-level SON function in a hierarchical structure of SON functions in a network, to interact with a high-level SON function.

The controller is operable to gather information regarding network conditions or subscriber activity (e.g., related to a network element operative to provide wireless communication services to one or more subscribers), and send the information, which includes the identity of the lower-level SON function, to a high-level SON function in a network.

In one implementation, the controller is further operable to perform one or more network optimization actions, and wherein the information includes the actions performed.

In one implementation, the information additionally includes one or more network optimization recommendations. The network optimization recommendation may be performed by the lower-level SON functions. In some implementations the network optimization recommendation is a suggested configuration parameter for the one or more lower-level SON functions.

The information regarding the network conditions may pertain to conditions of the lower-level SON function. Such conditions may comprise an internal status of or any other parameter pertaining to the lower-level SON function.

In one implementation, the controller is operable to receive, from the high-level SON function, one or more target parameters, and perform local network optimization according to the target parameters. The controller may be operable to receive, from the high-level SON function, an indication to activate or deactivate a network optimization or not, in response to the indication.

In one implementation, the controller is operable to detect a problem associated with the network element, wherein the information includes a description and/or details of the problem. The description of the problem may further include an anticipated source of the problem and/or a suggested solution to the problem.

In some implementations, sending the information includes sending the information over a 3GPP Itf-N interface, wherein the interface may include the Itf-N SON Policy Network Resource Model Integration Reference Point, the Itf-N Performance Management Integration Reference Point, and/or the Itf-N trace Integration Reference Point.

The information may include load balancing reporting, handover statistics, and/or individual User Equipment actions.

DETAILED DESCRIPTION

Two main categories of interaction between low- and high-level SON functions are distinguished.

Figure 6:
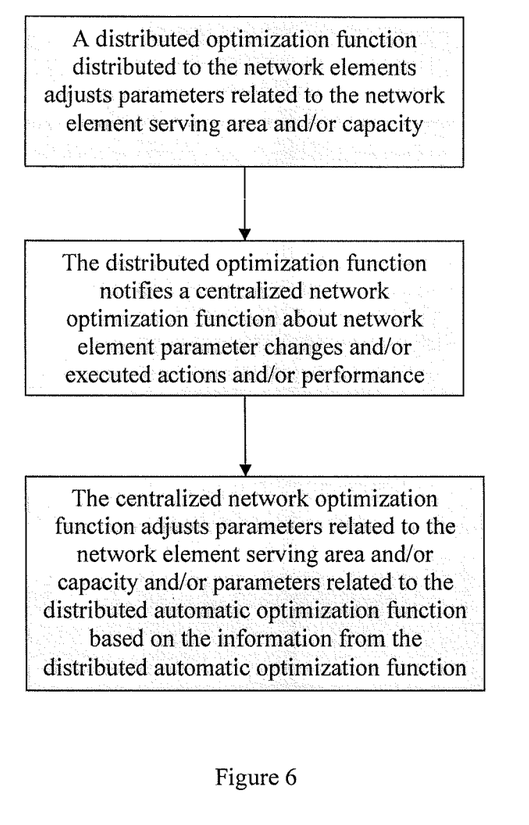
FIG. 6 is a flow diagram of cooperative SON function operation.

In the one case, SON functions at both hierarchical levels are performing network optimization actions on their own and in addition, the high-level SON function is observing the operation of the lower-level SON function. The observation is used to detect conflicting or suboptimal situations when coordination would be needed between the different layers. In such cases, the high-level SON function can execute the coordination either by changing target parameters of the lower-level SON function, activating/deactivating certain lower-level SON functions, or simply executing a high-level SON optimization itself, which reconfigures the domain in which lower-level SON function operates. A diagram of this mode of operation is depicted in FIG. 6.

In another case, the lower-level SON function is used only for the detection of a network problem, which is reported to higher-level SON function. The higher-level SON function then performs some network optimization action(s). One reason for such a deployment is that the lower-level SON function can utilize detailed information to detect and observe the network situation in real-time, while the high-level SON function can consider multiple sources of information (e.g., reports from multiple lower-level SON functions, each operating in a different cell) to make the best overall network optimization decision(s). For example, the detection of a main interferer can be done in the network, e.g., in the base station close to the radio interface where such measurements are steadily available, while the resolution of the problem is best solved at a centralized, higher level where multi-cell information is available. This mode of operation is similar to that depicted in FIG. 6; however, the distributed optimization function only takes and reports measurements and network events to the centralized network optimization function.

Accordingly, in one embodiment, actions taken by lower-level SON functions are reported to a high-level SON function. The actions can be reported on an event level (i.e., each action taken by the lower-level SON function, e.g., each load balancing based handover execution) or as an aggregate of the actions (e.g., ratio of load balancing based handovers).

In another embodiment, problems detected by lower-level SON functions are reported to the high-level SON function. The lower-level SON function detects the problem based on detailed information available in the NE and passes the problem description to the high-levels SON function, along with the details of the detected problem. The lower-level SON function may also provide information related to the expected source of the problem, and one or more possible solutions. For example, the lower-level SON function may have identified a critical load imbalance between two cells, but the users are located far from the cell borders, or the radio conditions are such that the lower-level SON function cannot do anything about the imbalance by forcing handoffs to a neighboring cell. In this case, the lower-level SON function can provide all of this information to the high-level SON function, which may alter cell boundaries by adjusting power levels and antenna tilt.

As representative examples of application of embodiments of the present invention, and to assist those of skill in the art to appreciate their application to other examples, a variety of network problems, management challenges, and opportunities for network optimization are presented below. The problem or optimization opportunity is first described, with an explanation of the information available and actions that may be taken to alleviate the problem and/or optimize the network. Application of embodiments of the present invention is then described, for example, listing the specific information that may be exchanged, and ways in which the optimization task may be allocated between or among SON functions. The areas described include Load Balancing, Mobility Robustness Optimization (MRO), Inter-Cell Interference (ICIC) Optimization, Physical Cell Identity (PCI) Conflict and Resolution, and Energy Efficiency (EE). Of course, the present invention is not limited to these conditions, and may find utility in a broad range of network problem solving or optimization scenarios. Those of skill in the art may readily apply the teachings disclosed herein to such areas, without undue experimentation.

Load Balancing

Load balancing (LB) or "traffic steering" works by moving users one by one from highly loaded cells to less load cells in order to improve the user performance, e.g., user bit rate. In one embodiment, a user being a good candidate for load balancing action, e.g., being located at the cell edge with relatively good link conditions to the neighboring cell, may be moved to the neighboring cell in order to balance the load between the two cells.

In another embodiment, the Handover Margin (HOM) (described more thoroughly later herein) of the UEs in a cell may be altered in order to trigger measurements of candidate cells either closer or further away from the serving cell, depending on the relative loads of the serving and candidate cells. UEs triggering such measurements are considered to be handed over to the reported candidate cell. The HOM may be regularly altered with the goal to even out the load between cells, or changed when one cell is considered to be in an overload situation or fails to meet the QoS of served users, and a candidate cell is not in an overload situation. In this case the overload cell may hand over several UEs satisfying the HOM criteria to alleviate the overload situation.

SON functions may be utilized to achieve load balancing and sharing between cells in many ways: fast or slow, distributed or centralized, via antenna reorientation or reference signal power levels via cell individual offsets affecting cell selection and mobility, via distributed traffic steering mechanisms, and the like. In one embodiment, a lower-level SON function moves individual users between cells, for example by considering individual cell offsets. This may counteract the negative impact of sudden peak loads, moving some users from one cell to another, perhaps for a few seconds. In one embodiment, the high-level SON function continuously monitors the load in each cell to make long-term adjustments to the cell borders via antenna and reference signal power parameters. Typically, this update will happen once or few times a day to handle natural load fluctuation due to changes in traffic patterns.

The actions of these two SON functions will contribute to the overall target—balancing the load and sharing the resources to optimize end user performance. However, the implementation is not straightforward. For the centralized load balancing to make correct decisions, the high-level SON function must consider the actions made by the lower-level SON functions in each network element to effect distributed load balancing and sharing, since these mitigate or even compensate for the load imbalance between two cells. Analyzing only the load situation in the cells, the centralized algorithm may conclude that there is no load imbalance between the cells. Such distributed load balancing incurs the cost of increased interference, which will not result in an optimal network capacity performance.

Another example is when the distributed load balancing and sharing has identified a load imbalance and has made attempts to share the load more evenly but failed. It may be due to the radio conditions that makes load sharing or mobile terminals intractable.

In embodiments disclosed herein, distributed SON observability informs the centralized SON function about actions taken in the decentralized network element SON function. This means that the decentralized network element load balancing and sharing need to be monitored by the centralized SON function.

In one embodiment, the distributed load balancing and sharing should report on topics including:

Handover statistics due to load balancing and sharing, related to a specific neighbor cell, carrier, RAT with information including: the number of attempted load balancing handovers; the number of successful load balancing handovers; and the number of intended load balancing handover attempts blocked by too low geometry.

Changes in individual cell relation offsets considered for handover, including: the old cell relation offset value; the new cell relation offset value; the reason for change; and the NE SON function triggering the action (=NE Load Balancing SON).

Individual handover events related to load balancing action, including: source/target RSRP, RSRQ, TA; user position (GNSS, eCID, CID, . . . ); cell load increase/decrease in source and target cell (including back plane); service (end user) utilization; and NE SON function triggering the action (=NE Load Balancing SON).

Detection of load unbalance situations, including: resource utilization in own—neighbor cells, for all services and per non-GBR/GBR users; number of users in source—target cells; distribution of users (in terms of own-neighbor signal strength, in terms of geographical location, . . . ); reason of failed load balancing at network element; proposed action for centralized SON function (e.g., coverage decrease/increase in Cell A); NE SON function triggering the action (=NE Load Balancing SON); and Queue length in source and target cell.

The information could be sent as individual events or be aggregated as counters, KPIs. The permanence of the cell borders may be realized via antenna reorientation (tilt, azimuth, beamwidth), or via reference signal power adjustments.

The centralized SON function can use the reported load balancing and sharing information as indications of whether individual cells should be expanded or reduced in size.

When the centralized SON function for antenna parameter configuration receives the statistics (and/or individual handover event reports) about the succeeded and attempted number of load balancing handovers, it may evaluate whether the average rate of LB related HOs (attempted or succeeded) is above some threshold from Cell A to Cell B. If that is the case, the centralized antenna optimization algorithm (i.e., the Coverage Capacity Optimization algorithm) could use it as a trigger to increase coverage area of Cell B and decrease coverage area of Cell A. The trigger could be used as one specific rule in a rule based optimization engine, for example, where multiple rules are typically present and the aggregated sum of triggered rules give the actionable output.

In another embodiment, the centralized load balancing considers aggregated and averaged cell size adjustments by the distributed SON function to derive new desired cell coverage regions.

In yet another embodiment, the centralized SON function also considers handover failure statistics, to derive cell size adjustments that correspond to successful handovers.

Mobility Robustness Optimization

Mobility robustness concerns handover parameter adjustments. Essentially three situations should be avoided.

First, too early handover, meaning that a UE is handed over to a candidate cell too early with a radio link or handover failure as a result. The UE returns soon to the source cell via re-establishment procedures.

Second, too late handover, meaning that the UE is handed over too late to the target cell, so that the link to the source cell breaks before completing the handover.

Third, handover to a wrong cell, meaning that the UE is attempted to be handed over to one target cell but the procedure fails, and soon thereafter the UE re-establishes at another cell. In most cases, it probably would have been better to have handed over the UE to the last target cell directly.

The MRO mechanism may adjust one or more of the following handover parameters controlling the event driven reporting of the UE: Threshold indicating how much stronger a certain candidate cell needs to be before it is reported to the serving cell; Filter coefficient applied to the measurement before evaluation triggers are considered; and Time to trigger meaning the time window within which the triggering condition needs to be continuously met in order to trigger the reporting event in the UE.

For example, a higher 'too early handover' ratio than desired can be counter-acted by increasing the threshold, delaying the report event trigger. As another example, a higher 'handover to wrong cell' ratio than desired can be counter-acted by increasing the threshold towards the first, unwanted, target cell.

Topics related to MRO include HO Oscillation, Handover Margin and Time-to-Trigger, HO Cause, and RLF Report.

Figure 3:
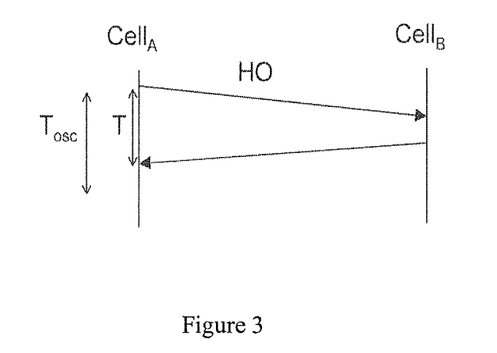
FIG. 3 is a diagram depicting HO oscillation.

Handover (HO) Oscillation is defined with respect to FIG. 3. If $T<T_{osc}$, then the HO is considered to be an oscillation. The oscillation rate can be defined as the ratio between the number of oscillations and the total number of HOs. There is an upper boundary for an acceptable oscillation rate originating from e.g., core network load. Also, the oscillation rate is related to end-user performance. On one hand oscillation are harmful as this induces additional signalling and delays, and on the other hand, oscillations allow the user to be connected to the best cell. This needs to be balanced in order for the end-user to experience the best performance.

The handover margin (HOM) is the difference between the radio quality of the serving cell and the radio quality needed before attempting a handover. The radio quality is measured either using RSRP or RSRQ. See 3GPP TS 36.305 for further information.

The UE triggers the intra-frequency handover procedure by sending an eventA3 report to the eNB. This event occurs when the UE measures that the target cell is better than the serving cell with a margin "HOM." The UE is configured over RRC when entering a cell, and the HOM is calculated from the following configurable parameters:

HOM=Ofs+Ocs+Off−Ofn−Ocn+Hys where

Ofs is the frequency specific offset of the serving cell;

Ocs is the cell specific offset of the serving cell;

Off is the a3-Offset;

Ofn is the frequency specific offset of the neighbor cell;

Ocn is the cell specific offset of the neighbor cell; and Hys is the hysteresis.

The HOM can thus be changed by modifying one or more of these parameters. For inter-frequency handover, a similar formula is used.

Time-to-trigger is the time period required before triggering a handover attempt. During this time the neighbor cell shall have better radio quality, and then the handover attempt is triggered. These are further explained in 3GPP TS 36.300.

Figure 4:
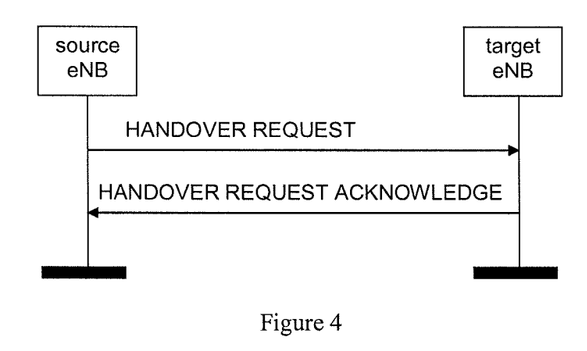
FIG. 4 is a signaling diagram depicting handover signaling.

HO Cause is the reason for the handover. Once the serving cell has decided to perform a HO based on measurement reports received from the UE, the source cell performs a HO Request over X2AP, as depicted in FIG. 4 (see 3GPP TS 36.423 for further information). In the HANDOVER REQUEST message, the source eNB must indicate the cause of the HO, which can be, e.g., Handover Desirable for Radio Reasons; Resource Optimisation Handover; or Reduce Load in Serving Cell. Thus the target eNB knows that the HO is due to resource optimization or to reduce the load in the serving cell. A similar signalling can be routed via S1 links and the MME, see S1AP, 3GPP TS 36.413.

Figure 5:
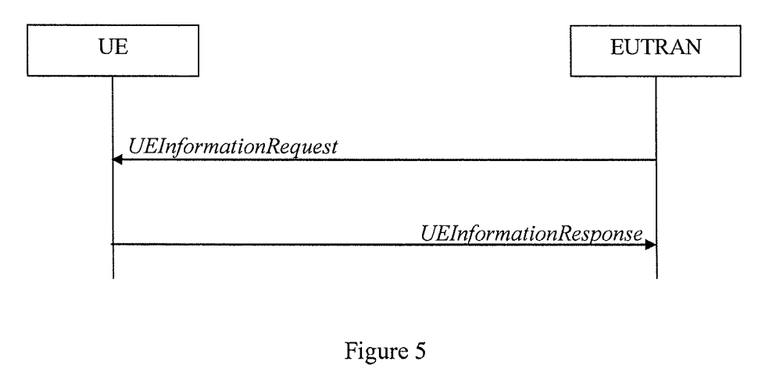
FIG. 5 is a signaling diagram depicting information exchange.

In the event of a Radio Link Failure (RLF), the eNB may request a report from the UE. Following an RRC Connection Reestablishment as a result of an RLF, the eNB may send a UEInformationRequest message to the UE, as shown in FIG. 5. See 3GPP TS 36.331 for more information. If the eNB requests for an RLF report in the UEInformationRequest message and the UE has such information, then the UE provides the following information to the eNB: The E-CGI of the last cell that served the UE (in case of RLF) or the target of the handover (in case of handover failure). If the E-CGI is not known, the PCI and frequency information are used instead; the E-CGI of the cell at which the re-establishment attempt was made; the E-CGI of the cell that served the UE at the last handover initialization, i.e. when message 7 (RRC Conn. Reconf.) was received by the UE, as presented in FIG. 10.1.2.1.1-1; the time elapsed since the last handover initialization until connection failure; an indication whether the connection failure was due to RLF or handover failure; and RSRP and RSRQ of the serving cell and the neighboring cells detected by UE at the RLF event. Using this information, the eNB can deduce whether the RLF was due to incorrect HO parameters (too early, too late) or due to a coverage hole (no cell with sufficient signal strength).

According to embodiments of the present invention, reported actions and measurements taken by the mobility robustness optimization SON function in the network element include:

Change of cell level handover parameter, including: source cell specific handover offset parameter: old—new value; neighbor cell specific handover offset parameter: old—new value; handover hysteresis parameter: old—new value; handover threshold parameter: old—new value; handover time to trigger parameter: old—new value; and reason for change; and NE SON function triggering the action (=NE MRO SON).

Change of UE specific handover parameters, including: changed handover parameter: old—new value; UE specific information (e.g., measured RSRP/RSRQ); cell specific information (e.g., cell load); reason of change; NE SON function triggering the action (=NE MRO SON).

Failed handover parameter optimization, including: reason of inability to fulfill handover performance targets; source cell-target cell; suggested action to higher SON (increase/decrease cell size); and NE SON function triggering the action (=NE MRO SON).

RLF reports where the cause of the RLF is due to a coverage hole.

The network element MRO function may have attempted to adjust handover parameters to counteract too early and/or too late handovers, but these counters cannot be improved. This means that MRO is unable to meet the targets on handover success rates etc. In one embodiment, distributed MRO indicates its problems with successfully adjusting handover parameters by sending the "Failed handover parameter optimization" message to the higher level SON function. This information is considered in centralized MRO function, and interpreted as a need for a more comprehensive cell overlap retuning between the two cells. This can be accomplished by antenna parameter adjustments, calculated by the central SON function and reconfigured in the network.

In another embodiment, the distributed MRO function may be able to find a parameter configuration at which the desired handover performance targets are fulfilled. However, the given parameter configuration may be sub-optimal from other aspects, e.g., causing too high inter-cell interference and users being served in bad interference situations. The higher level SON function can detect this situation based on the reported performance metrics and HO parameter values as set by the lower level SON function. Based on this information, the higher level SON function may place restrictions on the parameter range that can be tuned by the lower level SON function and/or may decide to change cell sizes and coverage area by adjusting antenna parameters.

Inter-Cell Interference Optimization

Inter-cell interference coordination (ICIC) was introduced in Release-8/9 of the 3GPP LTE standards. The basic idea of ICIC is keeping the inter-cell interferences under control by radio resource management (RRM) methods. ICIC is inherently a multi-cell RRM function that needs to take into account information (e.g. the resource usage status and traffic load situation) from multiple cells.

Distributed ICIC may have attempted to coordinate interference between two cells, but the reported cell-edge performance is still not satisfactory and the inter-cell interference is still too high.

In one embodiment, the distributed SON indicates the inability to resolve persistent interference situation to centralized SON, which considers this as an indication to reduce cell overlap between the two cells, for example via antenna adjustments or by reconfiguring the ICIC algorithm in the network element, e.g., by switching it to fixed reuse-N operation from reuse-1.

Reported action and measurements by ICIC SON function may include:

Indication of persistent interference, including: the reason for the inability of the distributed ICIC function to reduce interference; the main interfering neighbor cell; one or more suggested actions (switch to reuse-N, change cell sizes, . . . ); and the NE SON function triggering the action (=NE ICIC).

ICIC action taken, including: change in frequency domain resource allocation (e.g., protected vs. shared bands); and NE SON function triggering the action (=NE ICIC).

PCI Conflict and Resolution

When two or more cells share the same PCI (physical cell identity) or SC (scramble code) within the vicinity of a third cell there is a conflict that must be handled. When two or more cells in close vicinity have the same PCI or SC assigned, it makes the unique identification of neighbor cells measured by the UEs difficult or impossible, and thereby can result in handovers attempted toward the wrong cell.

The first step in resolving such conflict situation is to detect the collision. The NE receiving measurement reports from the UEs can detect when two or more cells have the same PCI assigned, for example by ordering the UEs to report both PCI and the globally unique cell identifier (GUCI). In the second step, during the resolution of the conflict, the solution could be a redesign of the PCI allocation to the cells. While the detection of the conflict can be done based on information collected and available in the NE, a reallocation of PCI codes needs to be done in a coordinated way with other cells. A coordinated reallocation of the PCI codes should be done from an entity with multi-cell, global knowledge, which is best done from the OAM system. Note that the initial allocation of PCI and SC codes is also determined from OAM during deployment phase.

Reported indication from NE PCI function may be the following:

Indication of PCI/SC collisions, including: List of colliding cells PCI and GUCI pairs: [(PCI-1,GUCI-1), (PCI-1, GUCI-2), . . . ]; and NE SON function triggering the action (=NE PCI).

Energy Efficiency

Energy efficiency (EE) mechanisms may temporary affect the capacity of the network element in order to save energy. For example, some antenna ports may be disabled during times of low loads. This will impact the cell load in terms of utilization of the available resources. A coverage and capacity optimizing centralized solution needs to be aware of the energy savings actions in order to correctly evaluate cell load via resource utilization.

Reported actions and measurements by energy efficiency SON function may include:

Energy saving action invoked by network EE function, including: Cell switched on/off; Frequency band/carrier switched on/off; Sectorization switched on/off; and the like.

In one embodiment, the centralized SON function does not consider statistics from cells that has been operating under energy efficiency adjustments.

In another embodiment, the centralized SON function adjusts the load in terms of resource utilization to correspond to a more comprehensive network element operation, for example with all antenna ports enabled.

SON Function Reporting Over Itf-N

The reporting of network element SON functions can be realized on the Itf-N standardized interface as defined by 3GPP (see FIG. 2 for the location of this interface in the logical architecture). The Itf-N functions are grouped and defined in so called Integration Reference Points (IRPs), which specify the information object classes and their attributes that are available on the given IRP. They also specify interactions, e.g., notifications, read/write of attributes etc., that are available on the IRP.

For managing network SON functions the "SON Policy Network Resource Model IRP" is already defined, which supports the controlling of network element SON functions, e.g., by setting targets and also the sending of notification to upwards, e.g., when certain attribute values have been changed. See 3GPP TS 32.522 for the detailed specification.

There are IRPs defined for instance, for PM which includes reporting of counters, KPIs on cell level and for trace, where the trace IRP enables the collection of more detailed events, messages, measurements on per UE level.

There is the Configuration Management (CM) Notification IRP (TS 32.302), which specifies a notification mechanism on Itf_N where the NM layer can subscribe to notifications from the DM layer, for example to receive alarms. In one realization, the SON function notifications may be added to the CM Notification IRP set.

Some of the SON reporting features introduced by embodiments of the present invention may be added as standardized notification procedures within the "SON Policy and Network Resource Model IRP," while others could be added into the PM reporting IRP.

Reporting features related to the actions of network element SON functions may be added into the SON IRP, for example in case of SON load balancing reporting, each of the following reporting features could be added as a separate notification in 32.522: Change of individual cell relation offsets considered for handover; and Detection of load unbalance situations.

Reporting features related to individual UE related actions (e.g., execution of a load balancing handover for that UE) may be best added to the trace IRP on Itf-N. In this case, the reported event would appear as yet another event in the collected trace record, such as Individual handover events related to load balancing action.

Yet another group of the introduced SON reporting features may be best defined as part of the PM IRP, in terms of counters, including for example the following (in case of load balancing SON): Handover statistics due to load balancing and sharing, related to a specific neighbor cell, carrier, RAT.

Figure 7:
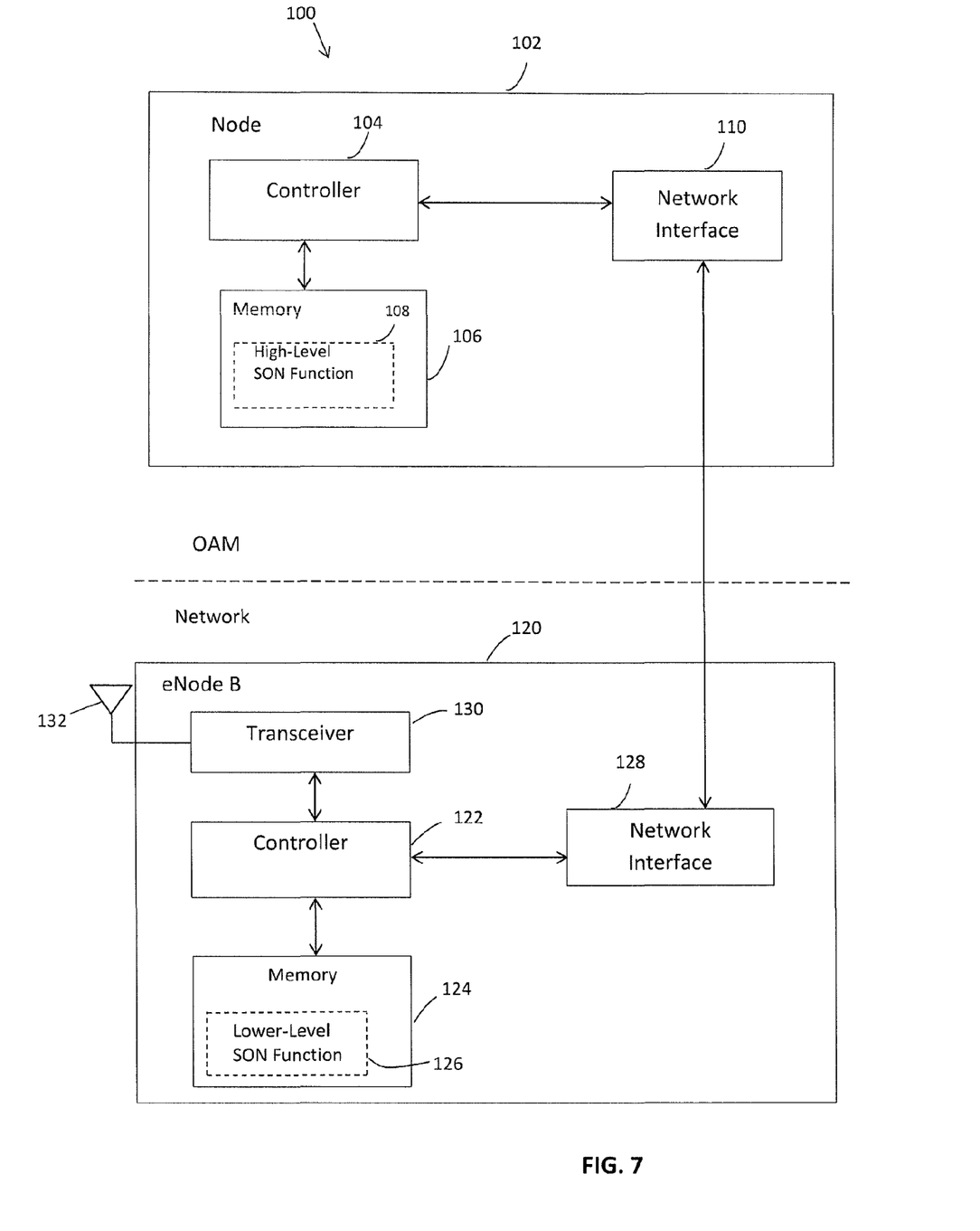
FIG. 7 depicts functional block diagrams of network nodes.

As depicted in FIGS. 1 and 2, the higher-level SON functions may be executed in network nodes in the core network, while the lower-level SON functions are preferably executed in access network nodes, such as the eNB. FIG. 7 depicts block diagrams of these nodes in a network 100.

The network node 102, in the core networkOperation and Maintenance system (or, generally, a core network), includes a controller 104 operatively connected to memory 106 and a network interface 110. Functional blocks not germane to the present discussion are omitted for clarity.

The processor 104 may comprise any sequential state machine operative to execute machine instructions stored as machine-readable computer programs in the memory 106, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 106 may comprise any nontransient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like. The memory 106 is operative to store computer program code 108 containing instructions operative to cause the controller 104 to implement the functionality of a high-level SON function.

The network interface 110 may take the form of a modem, modem bank, Ethernet device, universal serial bus (USB) interface device, serial interface, token ring device, fiber distributed data interface (FDDI) device, wireless local area network (WLAN) device, and/or other well-known devices for connecting to networks and exchanging data with other nodes in the network. The network interface 110 may enable the processor 104 to communicate with a broad array of networks and devices, but in particular is operative to implement communication with a plurality of eNode B nodes 120.

The node 120, in the radio access network (such as a RAN), which may for example comprise an eNode B in an LTE RAN or a node in a core network, includes a controller 130 operatively connected to memory 124, a network interface 128, and a transceiver 130 which is in turn connected to one or more antennas 132. Functional blocks not germane to the present discussion are omitted for clarity.

The processor 122, memory 124, and network interface 128 may comprise any hardware and/or software modules as described above for corresponding functionality in the network node 102. The memory 124 is operative to store computer program code 126 containing instructions operative to cause the controller 122 to implement the functionality of a lower-level SON function.

The transceiver 130 is operative to transmit and receive signals to and from UEs in the RAN, via the antenna(s) 132, according to a known wireless communication protocol, such as 3GPP LTE. Of course, in other embodiments, the transceiver 130 may operate according to code division multiple access (CDMA) protocols (e.g., UTRA, CDMA2000, WCDMA), global system for mobile communications (GSM), worldwide interoperability for microwave access (WiMAX), and/or other well-known wireless communication protocols.

Figure 8:
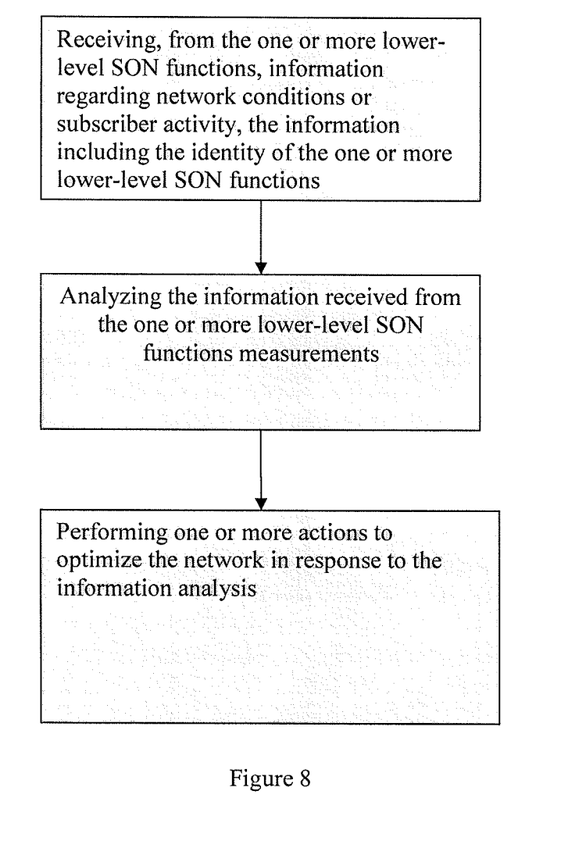
FIG. 8 is a flow diagram of SON function operation.

FIG. 8 is a flow diagram of a SON function operation. A high-level SON function, in a hierarchical structure of SON functions in a network, interacts with one or more lower-level SON functions. For example, information regarding network conditions or subscriber activity is received from one or more lower-level SON functions, the information including the identity of the lower-level SON function.

Moreover, network conditions may relate to conditions of the one or more lower-level SON functions. Such conditions may in one variant relate to an internal status of the one or more lower-level SON functions. In a specific example, the conditions may pertain to a possible impact of an action taken or to be taken by the one or more lower-level SON functions, SON targets underlying a specific action, SON function priorities, SON coordination policies, SON function states, and so on.

Network conditions and/or subscriber activity may also include a state or states of a managed object (e.g., an eNode B).

The information received from one or more lower-level SON functions is analyzed. One or more actions to optimize the network are performed in response to the information analysis.

In any case, the information received from one or more lower-level SON functions is analyzed. One or more actions to optimize the network are performed in response to the information analysis.

Embodiments of the present invention provide for different SON function to cooperate without really interacting directly. Instead a SON function makes its action visible with detailed information on its actions. This information together with what is normally available makes it possible for higher-level SON functions to make a correct decision.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method at a first network node configured for operation in a wireless communication network, said first network node implementing a first Self-Organizing Network (SON) function at a first hierarchical level in a hierarchy of SON functions implemented within the wireless communication network, said method comprising:
receiving signaling identifying a second SON function implemented at a second network node and operating at a lower, second hierarchical level, said received signaling further indicating actions taken by the second SON function for a local network optimization function;
evaluating the actions taken by the second SON function with respect to an overall network optimization function carried out by the first SON function, said overall network optimization function overlapping the local network optimization function;
identifying from the evaluation that the actions do not conform to the overall network optimization function; and
in response to said identifying, modifying one or more configuration parameters governing operation of the second SON function, to make subsequent actions taken by the second SON function conform to the overall network optimization function;
wherein the actions are load-balancing actions between certain cells of the wireless communication network, and wherein identifying that the actions do not conform to the overall network optimization function comprises identifying that the load-balancing actions are leading to overall loading imbalances between the cells.

2. The method of claim 1, wherein the second SON function performs local load balancing with respect to one or more cells and according to a second time scale, and wherein the first SON function performs overall load balancing with respect to multiple cells, including the one or more cells, and according to a longer, first time scale.

3. The method of claim 1, wherein the load-balancing actions are handovers of mobile terminals between two or more cells undertaken in response to short-term loading conditions in the two or more cells, such handovers referred to as load-balancing handovers.

4. The method of claim 1, wherein receiving the signaling comprises receiving the signaling over a 3GPP Interface N (Itf-N) interface.

5. The method of claim 4, wherein receiving the signaling over the Itf-N interface comprises receiving the signaling via an Itf-N SON Policy Network Resource Model Integration Reference Point.

6. The method of claim 4, wherein receiving the signaling over the Itf-N interface comprises receiving the information via an Itf-N Performance Management Integration Reference Point.

7. The method of claim 4, wherein receiving the signaling over the Itf-N interface comprises receiving the signaling via an Itf-N trace Integration Reference Point.

8. A method at a first network node configured for operation in a wireless communication network, said first network node implementing a first Self-Organizing Network (SON) function at a first hierarchical level in a hierarchy of SON functions implemented within the wireless communication network, said method comprising:
receiving signaling identifying a second SON function implemented at a second network node and operating at a lower, second hierarchical level, said received signaling further indicating actions taken by the second SON function for a local network optimization function;

evaluating the actions taken by the second SON function with respect to an overall network optimization function carried out by the first SON function, said overall network optimization function overlapping the local network optimization function;

identifying from the evaluation that the actions do not conform to the overall network optimization function; and in response to said identifying, modifying one or more configuration parameters governing operation of the second SON function, to make subsequent actions taken by the second SON function conform to the overall network optimization function;

wherein the actions taken by the second SON function are load-balancing handovers from one or more source cells of the wireless communication network to one or more target cells of the wireless communication network, and wherein receiving the signaling from the second SON function comprises receiving one or more reports indicating individual load-balancing handovers, or indicating handover statistics for a number of load-balancing handovers, wherein the overall network optimization function comprises an overall load-balancing function encompassing the source and target cells, and wherein identifying from the evaluation that the actions do not conform to the overall load-balancing function comprises determining that one or more target cells are being targeted too frequently, or not frequently enough, for load balancing between the source and target cells.

9. The method of claim 8, further comprising receiving information indicating at least one of mobile-terminal reception conditions and cell loading conditions corresponding to the load-balancing handovers performed by the second SON function, and considering the reception and network conditions when evaluating whether or not the load-balancing handovers conform with the overall load-balancing function.

10. A method at a first network node configured for operation in a wireless communication network, said first network node implementing a first Self-Organizing Network (SON) function at a first hierarchical level in a hierarchy of SON functions implemented within the wireless communication network, said method comprising:

receiving signaling identifying a second SON function implemented at a second network node and operating at a lower, second hierarchical level, said received signaling further indicating actions taken by the second SON function for a local network optimization function;

evaluating the actions taken by the second SON function with respect to an overall network optimization function carried out by the first SON function, said overall network optimization function overlapping the local network optimization function;

identifying from the evaluation that the actions do not conform to the overall network optimization function; and in response to said identifying, modifying one or more configuration parameters governing operation of the second SON function, to make subsequent actions taken by the second SON function conform to the overall network optimization function;

wherein receiving signaling from the second SON function comprises receiving signaling from one or more second SON functions operating in a Radio Access Network (RAN) of the wireless communication system, said second SON functions performing local load-balancing between two or more cells in the RAN, and said actions taken by the one or more second SON functions comprising load-balancing actions taken with respect to the two or more cells, wherein the overall network optimization function comprises an overall load-balancing function encompassing the two or more cells, and wherein evaluating the actions taken by the one or more second SON functions comprises evaluating an effect of the local load-balancing over a time scale longer than a time scale used by the one or more second SON functions for performing local-load balancing.

11. The method of claim 10, wherein modifying one or more configuration parameters that govern operation of the one or more second SON functions comprises transmitting signaling to modify a configuration parameter governing local load-balancing decisions at one or more of the second SON functions, said configuration parameter modified to reduce a non-conformance between the local load-balancing function and the overall load-balancing function.

12. The method of claim 11, wherein transmitting the signaling comprises transmitting signaling to modify at least one of: a cell relation offset and a target cell handover prioritization.

13. A first network node configured for operation in a wireless communication network, said first network node further configured to implement a first Self-Organizing Network (SON) function at a first hierarchical level in a hierarchy of SON functions implemented within the wireless communication network, said first network node comprising:

a network interface configured to receive signaling identifying a second SON function implemented at a second network node and operating at a lower, second hierarchical level, said received signaling further indicating actions taken by the second SON function for a local network optimization function; and a controller operatively associated with the network interface and configured to:

evaluate the actions taken by the second SON function with respect to an overall network optimization function carried out by the first SON function, said overall network optimization function overlapping the local network optimization function;

identify from the evaluation that the actions do not conform to the overall network optimization function; and in response to said identifying, modify one or more configuration parameters governing operation of the second SON function, to make subsequent actions taken by the second SON function conform to the overall network optimization function;

wherein the actions are load-balancing actions between certain cells of the wireless communication network, and wherein identifying that the actions do not conform to the overall network optimization function comprises identifying that the load-balancing actions are leading to overall loading imbalances between the cells.

14. The first network node of claim 13, wherein the second SON function performs local load balancing with respect to one or more cells and according to a second time scale, and wherein the first SON function performs overall load balancing with respect to multiple cells, including the one or more cells, and according to a longer, first time scale.

15. The first network node of claim 13, wherein the load-balancing actions are handovers of mobile terminals between two or more cells undertaken in response to short-term loading conditions in the two or more cells, such handovers referred to as load-balancing handovers.

16. The first network node of claim 13, wherein the network node is configured to receive the signaling over a 3GPP Interface N (Itf-N) interface.

17. The first network node of claim 16, wherein the network node is configured to receive the signaling via an Itf-N SON Policy Network Resource Model Integration Reference Point.

18. The first network node of claim 16, wherein the network node is configured to receive the signaling via an Itf-N Performance Management Integration Reference Point.

19. The first network node of claim 16, wherein the first network node is configured to receive the signaling via an Itf-N trace Integration Reference Point.

20. A first network node configured for operation in a wireless communication network, said first network node further configured to implement a first Self-Organizing Network (SON) function at a first hierarchical level in a hierarchy of SON functions implemented within the wireless communication network, said first network node comprising:
   a network interface configured to receive signaling identifying a second SON function implemented at a second network node and operating at a lower, second hierarchical level, said received signaling further indicating actions taken by the second SON function for a local network optimization function; and
   a controller operatively associated with the network interface and configured to:
      evaluate the actions taken by the second SON function with respect to an overall network optimization function carried out by the first SON function, said overall network optimization function overlapping the local network optimization function;
      identify from the evaluation that the actions do not conform to the overall network optimization function; and
      in response to said identifying, modify one or more configuration parameters governing operation of the second SON function, to make subsequent actions taken by the second SON function conform to the overall network optimization function;
   wherein the actions taken by the second SON function are load-balancing handovers from one or more source cells of the wireless communication network to one or more target cells of the wireless communication network,
   wherein the signaling received from the second SON function comprises one or more reports indicating individual load-balancing handovers, or indicating handover statistics for a number of load-balancing handovers,
   wherein the overall network optimization function comprises an overall load-balancing function encompassing the source and target cells, and
   wherein the controller is configured to determine that the load-balancing handovers do not conform to the overall load-balancing function based on identifying that one or more target cells are being targeted too frequently, or not frequently enough, for load balancing between the source and target cells.

21. The first network node of claim 20, wherein the controller is further configured to receive, via the network interface, information indicating at least one of mobile-terminal reception conditions and cell loading conditions corresponding to the load-balancing handovers performed by the second SON function, and to consider the reception and network conditions when evaluating whether or not the load-balancing handovers conform with the overall load-balancing function.

22. A first network node configured for operation in a wireless communication network, said first network node further configured to implement a first Self-Organizing Network (SON) function at a first hierarchical level in a hierarchy of SON functions implemented within the wireless communication network, said first network node comprising:
   a network interface configured to receive signaling identifying a second SON function implemented at a second network node and operating at a lower, second hierarchical level, said received signaling further indicating actions taken by the second SON function for a local network optimization function; and
   a controller operatively associated with the network interface and configured to:
      evaluate the actions taken by the second SON function with respect to an overall network optimization function carried out by the first SON function, said overall network optimization function overlapping the local network optimization function;
      identify from the evaluation that the actions do not conform to the overall network optimization function; and
      in response to said identifying, modify one or more configuration parameters governing operation of the second SON function, to make subsequent actions taken by the second SON function conform to the overall network optimization function;
   wherein the second SON function comprises one or more second SON functions operating in a Radio Access Network (RAN) of the wireless communication system, said second SON functions performing local load-balancing between two or more cells in the RAN, and said actions taken by the one or more second SON functions comprising load-balancing actions taken with respect to the two or more cells,
   wherein the overall network optimization function comprises an overall load-balancing function encompassing the two or more cells, and
   wherein the controller is configured to evaluate the actions taken by the one or more second SON functions by evaluating an effect of the local load-balancing over a time scale longer than a time scale used by the one or more second SON functions for performing local-load balancing.

23. The first network node of claim 22, wherein the controller is configured to modify the one or more configuration parameters governing operation of the one or more second SON functions by transmitting signaling to modify a configuration parameter governing local load-balancing decisions at one or more of the second SON functions, said configuration parameter modified to reduce a non-conformance between the local load-balancing function and the overall load-balancing function.

24. The first network node of claim 23, wherein the controller is configured to modify at least one of the following configuration parameters used by one or more of the one or more second SON functions for performing the local load-balancing function: a cell relation offset and a target cell handover prioritization.

25. A method at a first network node configured for operation in a wireless communication network, said first network node implementing a first Self-Organizing Network (SON) function at a first hierarchical level in a hierarchy of SON functions implemented within the wireless communication network, said method comprising:
- receiving signaling indicating actions taken by a second SON function implemented at a second network node and operating at a lower, second hierarchical level;
- evaluating the actions taken by the second SON function with respect to an overall network optimization function carried out by the first SON function;
- identifying, from the evaluation, that the actions do not conform to the overall network optimization function; and
- in response to said identifying, modifying one or more configuration parameters that govern operation of the second SON function, to make subsequent actions taken by the second SON function conform to the overall network optimization function;
- wherein the actions taken by the second SON function comprise local load-balancing actions taken with respect to one or more cells of the wireless communication network, and wherein the overall network optimization function comprises an overall load balancing function taken with respect to a plurality of cells of the wireless communication network, including the one or more cells.

* * * * *

UNITED STATES PATENT AND TRADEMARK OFFICE
CERTIFICATE OF CORRECTION

PATENT NO. : 9,461,886 B2
APPLICATION NO. : 14/380248
DATED : October 4, 2016
INVENTOR(S) : Rácz et al.

Page 1 of 1

It is certified that error appears in the above-identified patent and that said Letters Patent is hereby corrected as shown below:

In the Specification

In Column 1, Line 28, delete "Node B's" and insert -- Node Bs --, therefor.

In Column 1, Line 34, delete "operation and" and insert -- operation --, therefor.

In Column 4, Lines 65-66, delete "interface. wherein" and insert -- interface, wherein --, therefor.

In Column 8, Lines 8-9, delete "Interference (ICIC)" and insert -- Interference coordination (ICIC) --, therefor.

In Column 13, Line 66, delete "Itf_N" and insert -- Itf-N --, therefor.

In Column 14, Line 33, delete "networkOperation" and insert -- network Operation --, therefor.

In Column 14, Line 38, delete "processor 104" and insert -- controller 104 --, therefor.

In Column 14, Line 64, delete "processor 104" and insert -- controller 104 --, therefor.

In Column 15, Lines 3-4, delete "controller 130" and insert -- controller 122 --, therefor.

In Column 15, Line 8, delete "processor 122," and insert -- controller 122, --, therefor.

Signed and Sealed this
Thirteenth Day of March, 2018

Andrei Iancu
*Director of the United States Patent and Trademark Office*